United States Patent
Arulandu et al.

(10) Patent No.: US 10,070,488 B2
(45) Date of Patent: *Sep. 4, 2018

(54) POWER CONVERTER BETWEEN HALOGEN TRANSFORMER AND LED

(71) Applicant: PHILIPS LIGHTING HOLDING B.V., Eindhoven (NL)

(72) Inventors: Kumar Arulandu, Breda (NL); Georg Sauerlander, Aachen (DE); Sait Izmit, Utrecht (NL); Dennis Johannes Antonius Claessens, Eindhoven (NL); Philip Louis Zulma Vael, Temse (BE); Yi Wang, Delft (NL); Dalibor Cvoric, Utrecht (NL); Ronald Hans Van Der Voort, Helmond (NL); Patrick Alouisius Martina De Bruycker, Nuenen (NL); Robertus Leonardus Tousain, Shanghai (CN)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/466,291

(22) Filed: Mar. 22, 2017

(65) Prior Publication Data
US 2017/0196059 A1    Jul. 6, 2017

Related U.S. Application Data

(62) Division of application No. 14/646,594, filed as application No. PCT/IB2013/059885 on Nov. 4, 2013, now Pat. No. 9,629,208.

(Continued)

(51) Int. Cl.
*H05B 37/02* (2006.01)
*H05B 33/08* (2006.01)
*H02M 1/36* (2007.01)

(52) U.S. Cl.
CPC .......... *H05B 33/0815* (2013.01); *H02M 1/36* (2013.01); *H05B 33/083* (2013.01); *H05B 33/0809* (2013.01); *H05B 33/0887* (2013.01)

(58) Field of Classification Search
CPC ............ H05B 33/0815; H05B 33/0839; H05B 33/0842; H05B 33/0884; H05B 33/0875; H05B 37/02; H05B 39/04; H05B 39/045
See application file for complete search history.

(56) References Cited

U.S. PATENT DOCUMENTS

| | | | |
|---|---|---|---|
| 7,276,861 B1 | 10/2007 | Shteynberg et al. | |
| 2007/0188114 A1* | 8/2007 | Lys | H02M 1/4225 315/308 |

(Continued)

FOREIGN PATENT DOCUMENTS

| | | |
|---|---|---|
| WO | 2010023280 A1 | 3/2010 |
| WO | 2011033415 A1 | 3/2011 |

(Continued)

*Primary Examiner* — Kretelia Graham
*Assistant Examiner* — Henry Luong

(57) ABSTRACT

Control circuits (1) bring power converters (4) in different modes in response to detection results. The power converters (4) exchange possibly rectified first voltage/current signals with electronic halogen transformers (2) and supply second voltage/current signals to light emitting diode circuits (5). The first current signals have, in different modes, different amplitudes. The different amplitudes have different constant values and/or different derivative values. As a result, the first current signal has become a relatively varying first current signal. Then, the halogen transformers (2) no longer experience problems that occur when smaller amounts of power need to be provided than designed to. The detections may comprise polarity detections of and/or zero-crossing detections in the first voltage signals. The halogen transformers (2) comprise self-oscillating switched mode power supplies designed to provide first amounts of power at their outputs.

(Continued)

The light emitting diode circuits 5) are designed to consume second amounts of power smaller than the first amounts.

11 Claims, 11 Drawing Sheets

Related U.S. Application Data

(60) Provisional application No. 61/731,946, filed on Nov. 30, 2012.

(56) References Cited

U.S. PATENT DOCUMENTS

| | | |
|---|---|---|
| 2011/0012530 A1 | 1/2011 | Zheng et al. |
| 2012/0169246 A1* | 7/2012 | Eddeane ............ H05B 33/0842 315/276 |
| 2012/0229041 A1 | 9/2012 | Saes et al. |
| 2014/0312796 A1* | 10/2014 | Sauerlander ....... H05B 33/0815 315/210 |
| 2015/0305122 A1 | 10/2015 | Saes et al. |

FOREIGN PATENT DOCUMENTS

| | | |
|---|---|---|
| WO | 2011056068 A2 | 5/2011 |
| WO | 2012156891 A2 | 11/2012 |
| WO | 2013088333 A1 | 6/2013 |

* cited by examiner

POWER CONVERTER BETWEEN HALOGEN TRANSFORMER AND LED

CROSS REFERENCE TO RELATED CASES

This application is a Divisional application of U.S. application Ser. No. 14/646,594, filed on May 21, 2015, which is the U.S. National Phase Application of International Application No. PCT/IB2013/59885, filed on Nov. 4, 2013 and claims the benefit of U.S. Provisional Patent Application No. 61/731,946, filed on Nov. 30, 2012. These applications are hereby incorporated by reference herein.

FIELD OF THE INVENTION

The invention relates to a control circuit for controlling at least a part of a power converter. The invention further relates to a device, to a method, to a computer program product and to a medium.

Examples of such a power converter are single stage converters, dual stage converters, single boost converters, single buck converters, combinations of boost and buck converters, power regulators, current regulators and current limiters etc. Examples of such a device are the power converters mentioned above and lamps comprising one or more light emitting diodes etc.

BACKGROUND OF THE INVENTION

WO 2011/033415 A1 discloses an illumination device comprising a power input stage, a power buffer stage, a driver and a light emitting diode circuit. The power input stage, the power buffer stage and the driver could be considered to form a power converter.

When replacing a halogen lamp by a light emitting diode circuit while keeping the halogen transformer, problems may occur with the halogen transformer, owing to the fact that the halogen transformer is designed to provide a first amount of power to the halogen lamp, which first amount of power will usually be larger than a second amount of power that is consumed by the light emitting diode circuit. Halogen transformers require a minimum output power to perform well, and light emitting diode circuits require for example three to ten times less power than halogen lamps to produce a similar amount of light.

SUMMARY OF THE INVENTION

It is an object of the invention to provide a control circuit for improving a situation wherein a power converter is exchanging first voltage and current signals or rectified versions thereof with an electronic halogen transformer and wherein the power converter is supplying second voltage and current signals to a light emitting diode circuit. Further objects of the invention are to provide a device, a method, a computer program product and a medium.

According to a first aspect, a control circuit is provided for controlling at least a part of a power converter, the power converter comprising an input for exchanging first voltage and current signals or rectified versions thereof with an electronic halogen transformer, and the power converter comprising an output for supplying second voltage and current signals to a light emitting diode circuit, the control circuit comprising a detector for detecting an amplitude of at least one of the first voltage and current signals, and the control circuit comprising a controller for in response to a detection result from the detector bringing the power converter into different modes, the first current signal in the different modes having different amplitudes, the different amplitudes comprising different constant values and/or different derivative values.

The power converter may be connected to the electronic halogen transformer via a rectifier, in which case the power converter will receive rectified versions of the first voltage and current signals from the electronic halogen transformer. Alternatively, the rectifier may form part of the power converter, in which case the power converter will receive the first voltage and current signals from the electronic halogen transformer more directly.

The detector detects an amplitude of at least one of the first voltage and current signals. Usually, the detector will detect the amplitude of the first voltage signal, and the first current signal can then be controlled. Thereto, the controller will bring the power converter in response to a detection result from the detector into different modes. In respective (subsequent) first and second modes, the first current signal has respective first and second amplitudes that are different from each other. The respective first and second amplitudes may have respective first and second constant values that are different from each other or respective first and second derivative values that are different from each other or both. As a result, a relatively non-varying prior art first current signal has been converted into a relatively varying first current signal. The electronic halogen transformer, while providing such a varying first current signal, no longer experiences the problems, such as its oscillation fading out or being terminated, that usually occur when a constant value of the relatively non-varying prior art first current signal is given a too low value to reduce an amount of power supplied from the electronic halogen transformer to the power converter.

A light emitting diode circuit comprises one or more light emitting diodes of whatever kind(s) and in whatever combination(s).

An embodiment of the control circuit is defined by the controller being arranged to (de)activate at least a part of the power converter and/or to change a behavior of at least a part of the power converter for realizing the different subsequent modes. The (de)activation of at least a part of the power converter may for example comprise a (de)activation of a small part such as a transistor or an impedance or a (de)activation of a large part such as a group of transistors or a stage or a (de)activation of the entire power converter etc. The behavior of at least a part of the power converter may for example comprise a timing behavior or a frequency behavior or an impedance behavior or a hysteretic behavior or an inductive behavior (when comprising an inductor) or a capacitive behavior (when comprising a capacitor) or a (de)charge behavior (when (de)charging an inductor or a capacitor) etc.

An embodiment of the control circuit is defined by an average value of the first current signal, in case the control circuit is operating, being smaller than an average value of the first current signal, in case the control circuit is not operating. This way, the electronic halogen transformer provides a smaller amount of power than designed to provide.

An embodiment of the control circuit is defined by a detection of the amplitude of the at least one of the first voltage and current signals comprising a polarity detection and/or a zero-crossing detection. Usually, the detector will detect the amplitude of the first voltage signal, such as subsequent polarities of the first voltage signal or such as subsequent zero-crossings of the first voltage signal. A detection of one polarity may be considered to coincide with one half of a cycle of the first voltage signal and may provide two subsequent zero-crossings indirectly owing to the fact that the zero-crossings will take place just before and just after a duration of this one polarity. In case a zero-crossing needs to be detected more precisely, subsequent polarities could be detected. One polarity change is a good indication of a zero-crossing. The zero-crossings can then be found between a positive polarity and a negative polarity, and vice versa. Two subsequent polarity changes of the first voltage signal and/or two subsequent zero-crossings of the first voltage signal are good indications of one half of a cycle of the first voltage signal. Similarly, the amplitude of the first current signal may be detected.

An embodiment of the control circuit is defined by the controller being arranged to introduce at least two entire different modes during one half of a cycle of the first voltage signal. Preferably, for reasons of stabilization, one entire mode should not coincide with a zero-crossing or a polarity-change of the first voltage signal. At least two entire modes are necessary for creating the relatively varying first current signal.

An embodiment of the control circuit is defined by the controller being arranged to define an amount of power supplied to the light emitting diode circuit via a definition of a timing of the modes and/or via a definition of the constant values. The timing and/or the constant values may be used to adapt an average value of the first current signal. An adaptation of the average value of the first current signal results in an adaptation of an amount of power supplied from the electronic halogen transformer to the power converter.

An embodiment of the control circuit is defined by the different modes comprising
- a first mode wherein an amplitude of the first current signal has a first constant value and a second mode wherein an amplitude of the first current signal has a second constant value larger than the first constant value,
- a first mode wherein an amplitude of the first current signal has a first constant value and a second mode wherein an amplitude of the first current signal has a second constant value smaller than the first constant value and a third mode wherein an amplitude of the first current signal has a third constant value larger than the second constant value,
- a first mode wherein an amplitude of the first current signal has a first constant value and a second mode wherein an amplitude of the first current signal has a first positive derivative value and a third mode wherein an amplitude of the first current signal has a first negative derivative value,
- a first mode wherein an amplitude of the first current signal has a first negative derivative value and a second mode wherein an amplitude of the first current signal has a first positive derivative value and a third mode wherein an amplitude of the first current signal has a second negative derivative value and a fourth mode wherein an amplitude of the first current signal has a second positive derivative value,
- a first mode wherein an amplitude of the first current signal has a first constant value and a second mode wherein an amplitude of the first current signal has a second constant value larger than the first constant value and has a first positive derivative value, and/or
- a first mode wherein an amplitude of the first current signal has a constant value and a second mode wherein an amplitude of the first current signal has a first positive derivative value and a third mode wherein an amplitude of the first current signal has a first negative derivative value and a fourth mode wherein an amplitude of the first current signal has a second positive derivative value and a fifth mode wherein an amplitude of the first current signal has a second negative derivative value.

For each one of the six cases, two or more of the different modes may trade places, smaller and larger constant values may trade places, constant values may be replaced by derivative values, and vice versa, and positive derivative values may be replaced by negative derivative values, and vice versa. And for each two or more of the six cases, a part of one of them and a part of another one of them may be combined.

An embodiment of the control circuit is defined by the control circuit further comprising a further detector for detecting a value of the first voltage signal or a rectified version thereof and/or a value of the first current signal or a rectified version thereof. Instantaneous and/or average values of the first voltage and current signals or rectified versions thereof might be used for controlling amounts of power supplied to the light emitting diode circuit.

An embodiment of the control circuit is defined by the controller being arranged to change an amount of power supplied to the light emitting diode circuit via a definition of a timing of the modes and/or via a definition of the constant values in response to a detection result from the further detector. Again, but now further in response to a detection result from the further detector, the timing and/or the constant values may be used to adapt an average value of the first current signal.

An embodiment of the control circuit is defined by the control circuit further comprising a start-up circuit for adapting at least one of the first voltage and current signals. Such a start-up circuit improves a performance of a combination of the control circuit and the power converter, such as a power factor and/or an efficiency in non-dimming applications.

An embodiment of the control circuit is defined by the electronic halogen transformer comprising a self-oscillating switched mode power supply designed to provide a first amount of power at its output, the light emitting diode circuit being designed to consume a second amount of power, the second amount being smaller than the first amount.

According to a second aspect, a device is provided comprising the control circuit as defined above and further comprising the power converter and/or the light emitting diode circuit.

According to a third aspect, a method is provided for controlling at least a part of a power converter, the power converter comprising an input for exchanging first voltage and current signals or rectified versions thereof with an electronic halogen transformer, and the power converter comprising an output for supplying second voltage and current signals to a light emitting diode circuit, the method comprising a step of detecting an amplitude of at least one of the first voltage and current signals, and the method comprising a step of in response to a detection result from said detecting bringing the power converter into different modes, the first current signal in the different modes having different amplitudes, the different amplitudes comprising different constant values and/or different derivative values.

According to a fourth aspect, a computer program product is provided for performing the steps of the method as defined above.

According to a fifth aspect, a medium is provided for storing and comprising the computer program product as defined above.

A basic idea is that the first current signal should be a relatively varying first current signal.

A problem to provide a control circuit for improving a situation wherein a power converter is exchanging first voltage and current signals or rectified versions thereof with an electronic halogen transformer and wherein the power converter is supplying second voltage and current signals to a light emitting diode circuit has been solved.

A further advantage is that the different modes introduce additional control options.

These and other aspects of the invention will be apparent from and elucidated with reference to the embodiments described hereinafter.

DETAILED DESCRIPTION OF EMBODIMENTS

Figure 1:
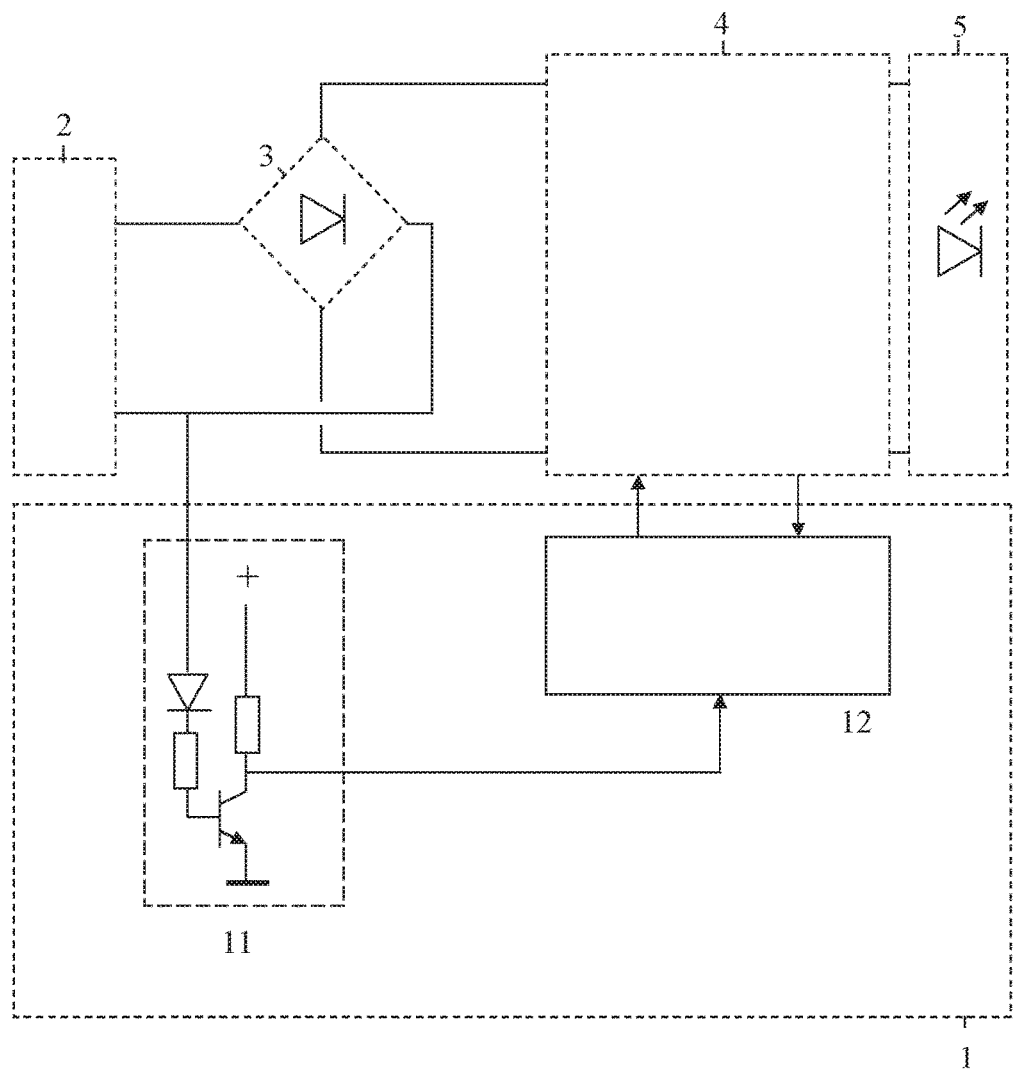
FIG. 1 shows a first embodiment of a control circuit connected to a power converter coupled to an electronic halogen transformer via a rectifier and coupled to a light emitting diode circuit.

In the FIG. 1, a first embodiment of a control circuit 1 is shown. The control circuit 1 is connected to a power converter 4 for supplying a mode signal to the power converter 4 for bringing the power converter 4 into different modes. Optionally, the control circuit 1 may receive a buffer signal from the power converter 4. An input of the power converter 4 is coupled to an electronic halogen transformer 2 via a rectifier 3 for exchanging rectified versions of first voltage and current signals with the electronic halogen transformer 2. Alternatively, the rectifier 3 may form part of the power converter 4 in which case the power converter 4 and the electronic halogen transformer 2 exchange the first voltage and current signals more directly. An output of the power converter 4 is coupled to an input of a light emitting diode circuit 5 for supplying second voltage and current signals to the light emitting diode circuit 5. The control circuit 1 controls at least a part of the power converter 4.

The control circuit 1 comprises a detector 11 for detecting an amplitude of at least one of the first voltage and current signals, and comprises a controller 12 for in response to a detection result from the detector 11 bringing the power converter 4 into the different modes. In the different modes, the first current signal has different amplitudes. The different amplitudes comprise different constant values (different levels) and/or different derivative values (different shapes).

Preferably, the controller 12 (de)activates at least a part of the power converter 4 and/or changes a behavior of at least a part of the power converter 4 for realizing the different modes. Preferably, an average value of the first current signal, in case the control circuit 1 is operating, will be smaller than an average value of the first current signal, in case the control circuit 1 is not operating.

In the FIG. 1, further an embodiment of the detector 11 is shown. Here, the detector 11 comprises a transistor with a control electrode coupled via a resistor and a diode to one of the output terminals of the electronic halogen transformer 2. A first main electrode of the transistor is connected to ground, and a second main electrode of the transistor is connected to the controller 12 and is coupled via another resistor to a voltage supply terminal. However, many other embodiments of the detector 11 will be clear to a person skilled in the art and are not to be excluded.

Preferably, a detection of the amplitude of the at least one of the first voltage and current signals comprises a polarity detection of and/or a zero-crossing detection in the first voltage signal. Preferably, the controller introduces at least two entire different modes during one half of a cycle of the first voltage signal.

The detector 11 shown in the FIG. 1 detects one polarity. Owing to the fact that the zero-crossings will take place just before and just after a duration of this one polarity, this detector 11 indirectly also provides the zero-crossings. However, in case these zero-crossings need to be detected more precisely, two detectors 11 identical to the one shown in the FIG. 1 may be used, a first one coupled to a first terminal of the input of the rectifier 3 and a second one coupled to a second terminal of the input of the rectifier 3. The zero-crossings can then be found between a positive polarity and a negative polarity, and vice versa.

Figure 2:
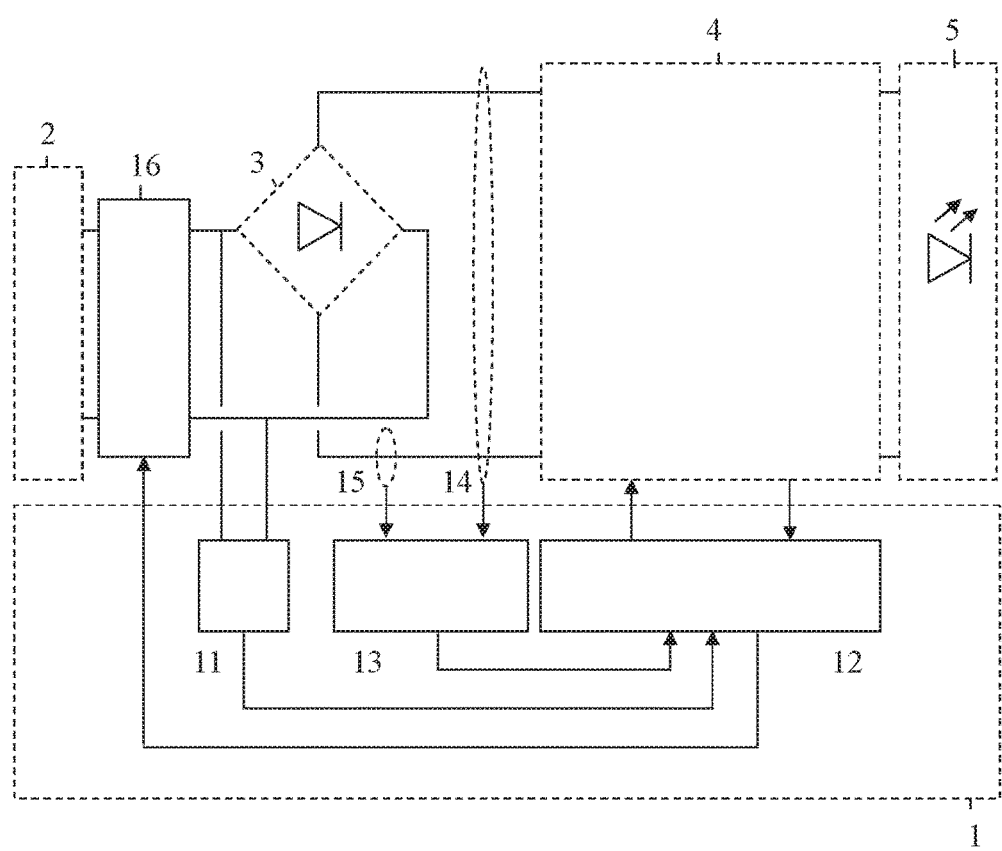
FIG. 2 shows a second embodiment of a control circuit connected to a power converter coupled to an electronic halogen transformer via a rectifier and coupled to a light emitting diode circuit.

In the FIG. 2, a second embodiment of a control circuit 1 is shown. This second embodiment differs from the first embodiment in that the control circuit 1 further comprises a further detector 13. The further detector 13 for example detects a value of a rectified version of the first voltage signal via a voltage determination circuit 14 that for example comprises a serial connection of two resistors in parallel to the input of the power converter 4 by measuring a voltage at the interconnection between the resistors, with one of the resistors possibly being connected in parallel to a capacitor. Alternatively, a value of the (non-rectified) first voltage signal may be detected. The further detector 13 for example detects a value of a rectified version of the first current signal via a current determination circuit 15 that for example comprises a resistor connected serially to a terminal of the input of the power converter 4 by measuring a voltage across this resistor. Alternatively, a value of the (non-rectified) first current signal may be detected. Further alternatively, the circuits 14 and/or 15 may form part of the power converter 4.

A detection of the rectified first voltage signal could reveal an unbalance in a capacitive half bridge of the electronic halogen transformer. The unbalance of the capacitive half bridge can be actively corrected by detecting the unbalance and adjusting the current amplitudes per half a cycle of the first voltage signal. The detection of the rectified first voltage signal may also reveal an envelope of a transformed mains voltage which may also contain some phase cut dimming information.

The system further comprises a start-up circuit 16 for adapting at least one of the first voltage and current signals.

Thereto, the start-up circuit 16 is located between the output terminals of the electronic halogen transformer 2 and the input terminals of the rectifier 3. Here, the start-up circuit 16 is shown outside the control circuit 1 and outside the electronic halogen transformer 2, alternatively, the start-up circuit 16 may be located inside the control circuit 1 and/or may be located inside the electronic halogen transformer 2. The start-up circuit 16 can inject a start-up current pulse into the electronic halogen transformer 2, in case the electronic halogen transformer 2 has stopped oscillating. The start-up current pulse initiates a start-up of the oscillation. This way, the oscillation of the electronic halogen transformer 2 can be controlled from its secondary side. The start-up circuit 16 improves a performance of the electronic halogen transformer 2, but is not necessarily present, owing to the fact that inside the electronic halogen transformer 2 an initiating unit is present. The initiating unit, as shown in the FIG. 3, also initiates a start-up of the oscillation, but at a (much) lower initiation frequency than the start-up circuit 16 can do. Further, the start-up circuit 16 can be controlled advantageously, contrary to the initiating unit, that is usually not controlled.

The controller 12 receives first detection signals from the detector 11 and receives second detection signals from the further detector 13 and supplies a start-up signal to the start-up circuit 16.

Figure 3:
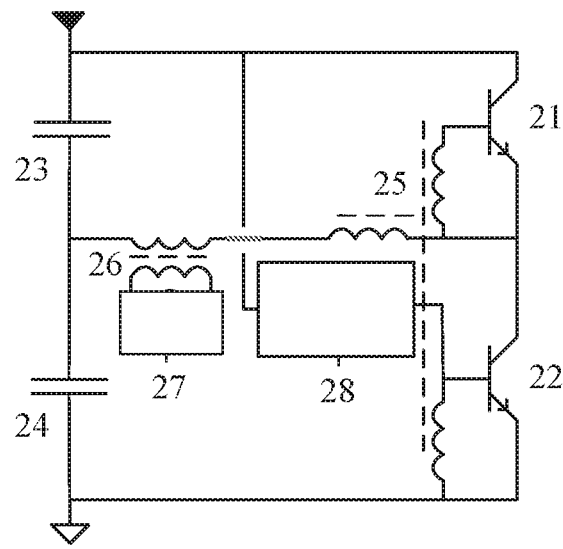
FIG. 3 shows an embodiment of an electronic halogen transformer.

In the FIG. 3, an embodiment of an electronic halogen transformer 2 is shown, in a simplified version. The electronic halogen transformer 2 comprises two transistors 21 and 22. A first main electrode of the transistor 21 is coupled to a voltage supply terminal to be coupled to the mains possibly via a filter not shown and usually forming part of the electronic halogen transformer 2 and/or possibly via a dimmer. The voltage supply terminal is further coupled to one side of a capacitor 23. A second main electrode of the transistor 21 is coupled to a first main electrode of the transistor 22. A second main electrode of the transistor 22 is coupled to ground or another reference voltage. Another side of the capacitor 23 is coupled to one side of a capacitor 24, and another side of the capacitor 24 is coupled to ground or the other reference voltage. A first winding of a first transformer 25 is connected to the control electrode and the second main electrode of the transistor 21. A second winding of the first transformer 25 is connected to the control electrode and the second main electrode of the transistor 22. A third winding of the first transformer 25 is coupled to the second main electrode of the transistor 21 and to one side of a first winding of a second transformer 26. Another side of the first winding of the second transformer 26 is coupled to the other side of the capacitor 23. A second winding of the transformer 26 is coupled to a unit 27, that represents a combination of the rectifier 3 and the power converter 4 and in addition either a halogen lamp (prior art) or the light emitting diode circuit 5. Two or more units 27 connected in parallel to each other are not to be excluded. Finally, an initiating unit 28 known in the art is coupled to the voltage supply terminal and to the control electrode of the transistor 22.

Figure 4:
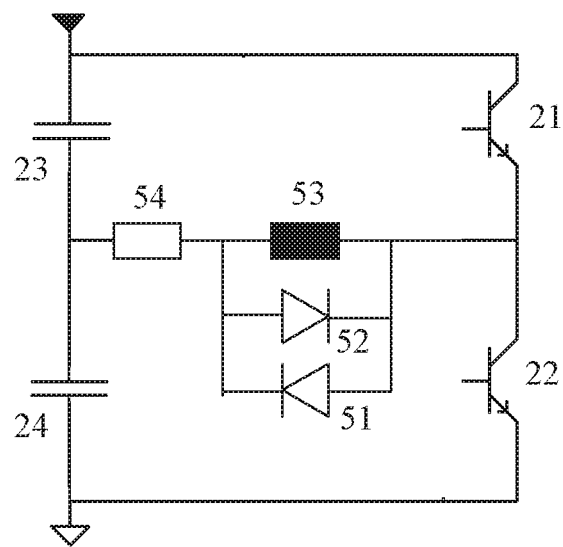
FIG. 4 shows an analysis of the electronic halogen transformer.

In the FIG. 4, an analysis of the electronic halogen transformer 2 is shown, in a simplified version. Compared to the FIG. 3, the second transformer 26 and the unit 27 have been replaced by a resistor 54, and the first transformer 25 has been replaced by an inductor 53 coupled in parallel to a first diode 51 representing the junction from the control electrode to the first main electrode of the transistor 21 and coupled in parallel to a second diode 52 representing the junction from the control electrode to the first main electrode of the transistor 22.

Figure 5:
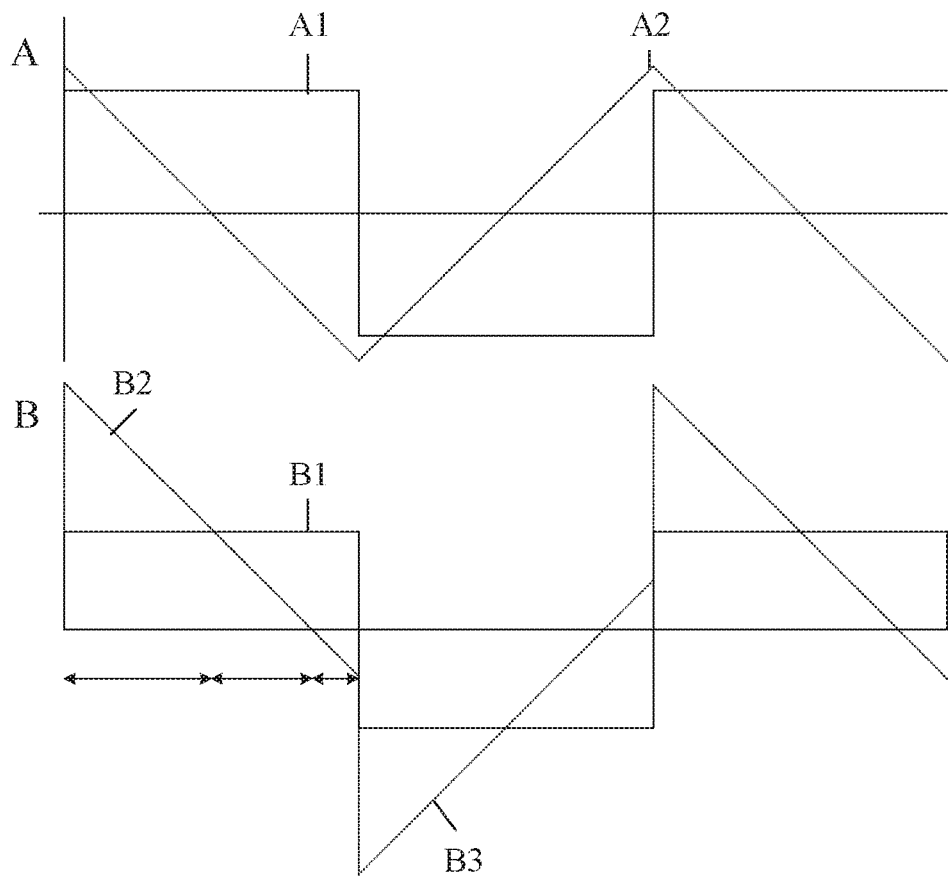
FIG. 5 shows first waveforms.

In the FIG. 5, first waveforms are shown (prior art). In view of the FIGS. 1-5, the graph A1 represents a first voltage signal at an output of the electronic halogen transformer 2, and the graph A2 represents a current signal flowing through the inductor 53. The graph B1 represents a first current signal flowing from the output of the electronic halogen transformer 2 to the rectifier 3, the graph B2 (decreasing line) represents a current signal flowing through the diode 51, and the graph B3 (increasing line) represents a current signal flowing through the diode 52. Clearly, the first current signal (the graph B1) has, although alternating, a constant amplitude.

Figure 6:
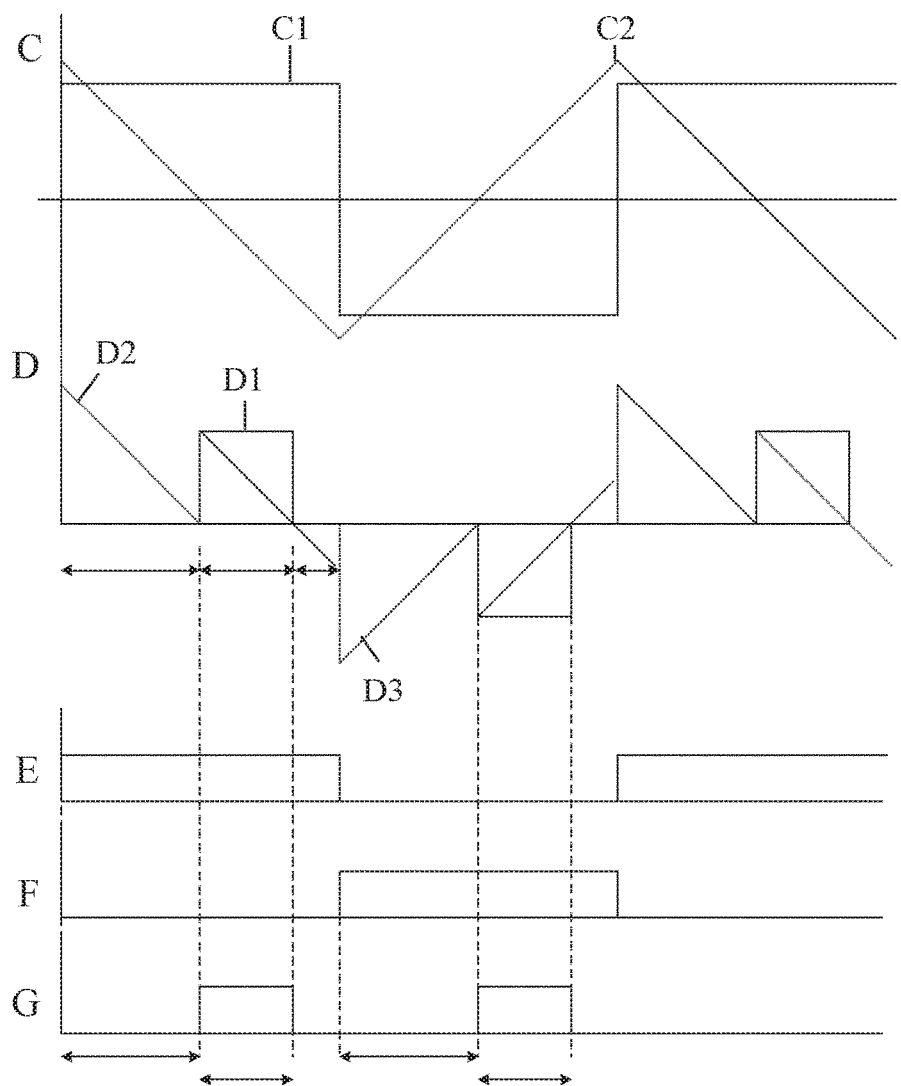
FIG. 6 shows second waveforms.

In the FIG. 6, second waveforms are shown. In view of the FIGS. 1-5, the graph C1 represents a first voltage signal at an output of the electronic halogen transformer 2, and the graph C2 represents a current signal flowing through the inductor 53. The graph D1 represents a first current signal flowing from the output of the electronic halogen transformer 2 to the rectifier 3, the graph D2 (decreasing lines) represents a current signal flowing through the diode 51, the graph D3 (increasing lines) represents a current signal flowing through the diode 52, the graphs E and F represent polarity detections and/or zero-crossing detections, and the graph G represents different modes of the power converter 4. Here, firstly, a first mode is introduced (the graph D1 is equal to zero), thereafter a second mode is introduced (the graph D1 is unequal to zero), followed by a time-interval resulting from parasitics. Then the first and second modes and the parasitic time-interval are repeated etc. The first current signal (the graph D1) has got a pulsed shape here.

More in general, in the FIG. 6, there is a first mode wherein an amplitude of the first current signal has a first constant value and a second mode wherein an amplitude of the first current signal has a second constant value larger than the first constant value etc.

Figure 7:
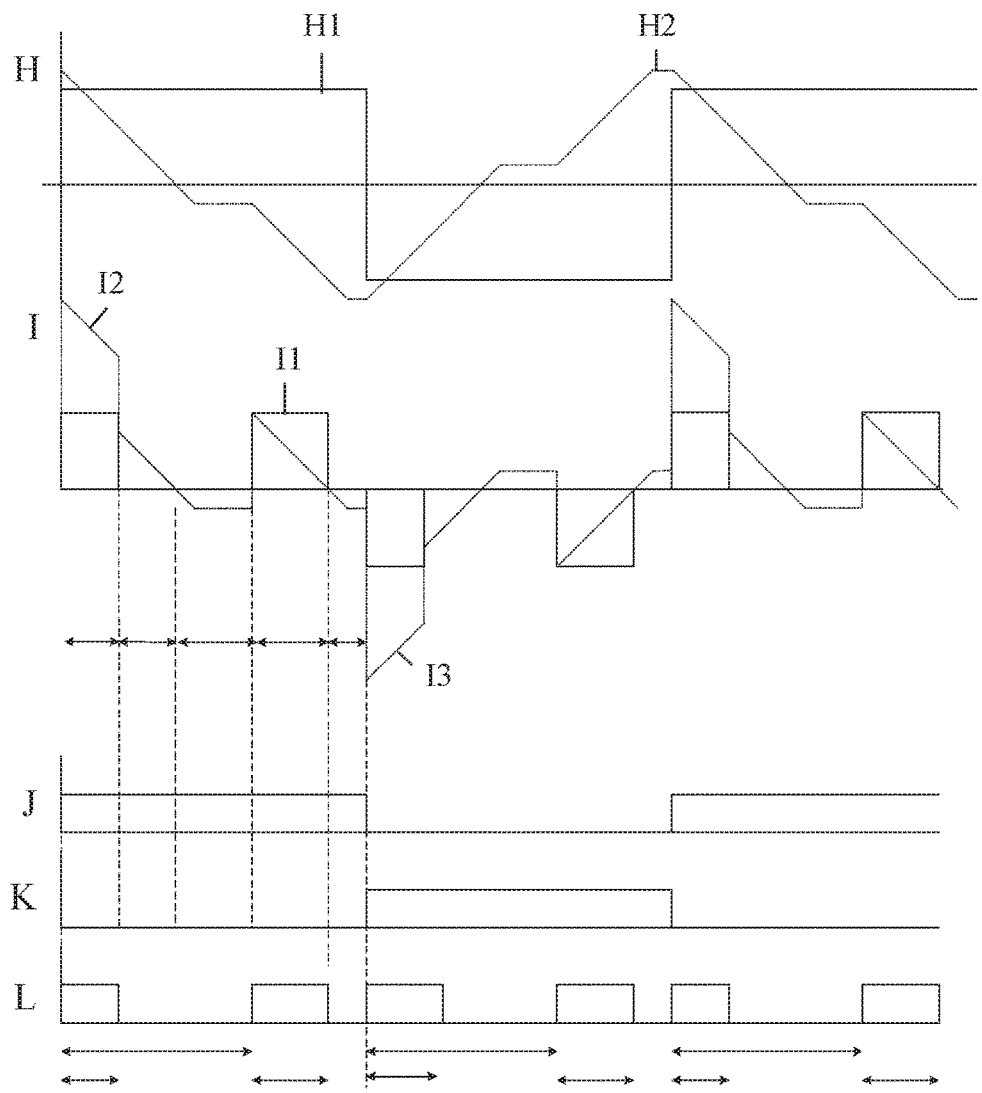
FIG. 7 shows third waveforms.

In the FIG. 7, third waveforms are shown. In view of the FIGS. 1-5, the graph H1 represents a first voltage signal at an output of the electronic halogen transformer 2, and the graph H2 represents a current signal flowing through the inductor 53. The graph I1 represents a first current signal flowing from the output of the electronic halogen transformer 2 to the rectifier 3, the graph I2 (decreasing lines) represents a current signal flowing through the diode 51, the graph I3 (increasing lines) represents a current signal flowing through the diode 52, the graphs J and K represent polarity detections and/or zero-crossing detections, and the graph L represents different modes of the power converter 4. Here, firstly, a first mode is introduced (the graph I1 is unequal to zero), thereafter a second mode is introduced (the graph I1 is equal to zero), then a third mode is introduced (the graph I1 is unequal to zero), followed by a time-interval resulting from parasitics. Then the first and second and third modes and the parasitic time-interval are repeated etc. The first and third modes may be identical modes or not. The first current signal (the graph I1) has got a pulsed shape here.

More in general, in the FIG. 7, there is a first mode wherein an amplitude of the first current signal has a first constant value and a second mode wherein an amplitude of the first current signal has a second constant value smaller than the first constant value and a third mode wherein an amplitude of the first current signal has a third constant value larger than the second constant value etc.

In the FIG. 6, the controller 12 is arranged to at least introduce one entire first mode and one entire second mode during one half of a cycle of the first voltage signal (one pulse per half a cycle of the first voltage signal). In the FIG. 7, the controller 12 is arranged to at least introduce one entire second mode and one entire first mode and one entire third mode during one half of a cycle of the first voltage signal (two pulses per half a cycle of the first voltage signal). Again, the third mode may be identical to the first mode or not.

Figure 8:
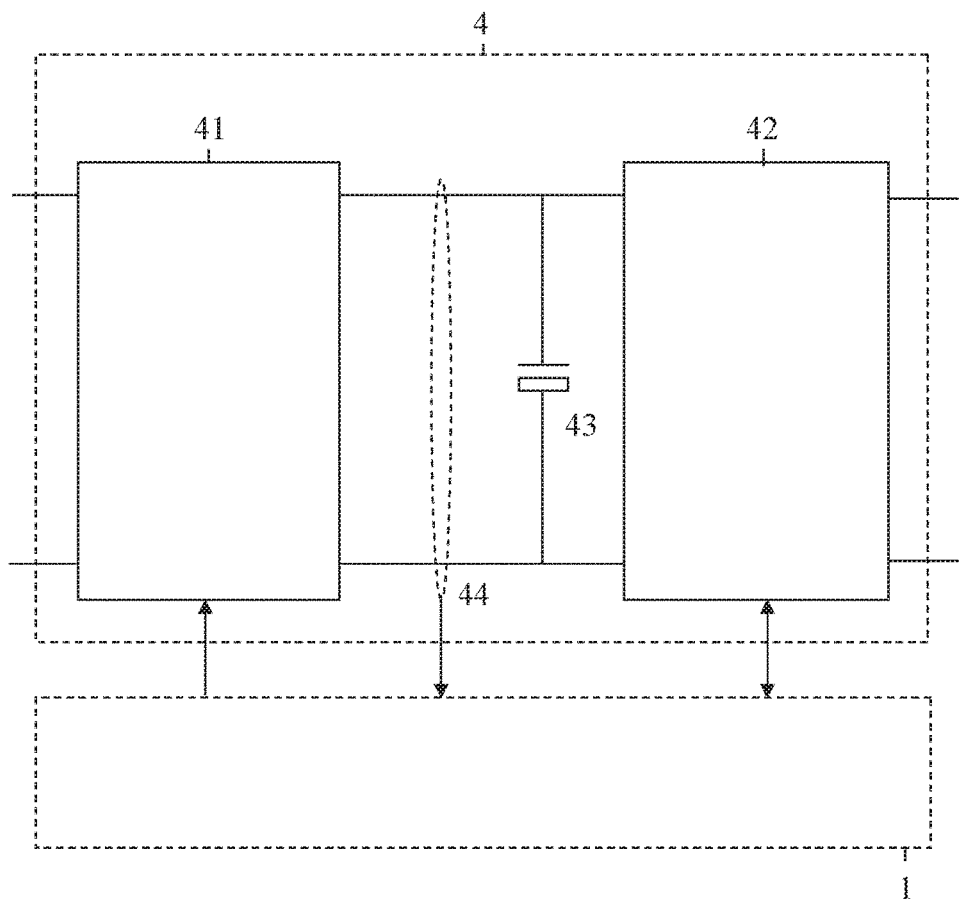
FIG. 8 shows an embodiment of a power converter.

In the FIG. 8, an embodiment of a power converter 4 is shown. This power converter 4 comprises a boost converter 41 and a buck converter 42, an input of the buck converter 42 being coupled to an output of the boost converter 41. Between both converters 41 and 42, a storage capacitor 43 may sometimes be present, and a voltage determination circuit 44 for example similar to the circuit 14 for monitoring an indication of an amount of stored energy present in the storage capacitor 43 may be present. Alternatively, the storage capacitor 43 and/or the circuit 44 may form part of the boost converter 41 or the buck converter 42. The control circuit 1 is connected to the boost converter 41 for supplying the mode signal to the power converter 4 and is connected to the circuit 44 for receiving the buffer signal from the power converter 4 and is connected to the buck converter 42 for supplying to and/or receiving a pulse width modulation signal from the power converter 4 for further control etc. Many other embodiments of the power converter 4 are not to be excluded, such as single stage converters, dual stage converters, single boost converters, single buck converters, power regulators, current regulators and current limiters etc.

Figure 9:
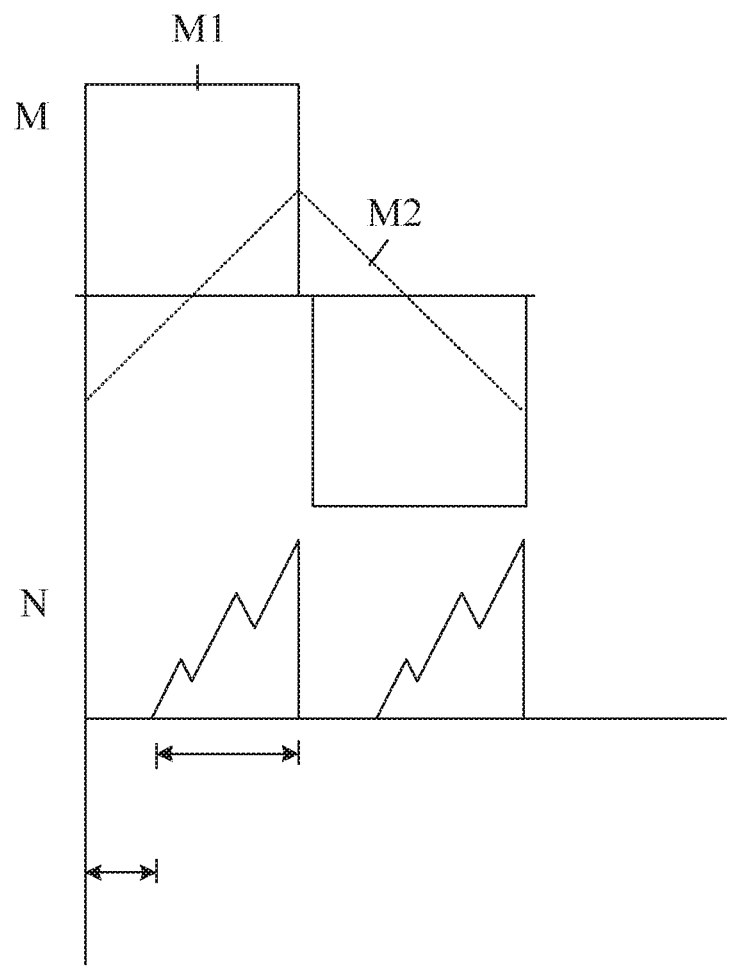
FIG. 9 shows fourth waveforms.

In the FIG. 9, fourth waveforms are shown. In view of the FIGS. 1-5, the graph M1 represents a first voltage signal at an output of the electronic halogen transformer 2, and the graph M2 represents a current signal flowing through the inductor 53. The graph N represents a rectified first current signal flowing from an output of the rectifier 3 to an input of the power converter 4. Here, firstly, a first mode is introduced (the graph N is equal to zero), thereafter a second mode is introduced (the graph N is increasing), thereafter a third mode is introduced (the graph N is decreasing), thereafter a fourth mode is introduced (the graph N is increasing), thereafter a fifth mode is introduced (the graph N is decreasing), thereafter a sixth mode is introduced (the graph N is increasing), thereafter a seventh mode is introduced (the graph N is equal to zero) etc. The first and seventh modes may be identical modes or not, the second, fourth and sixth modes may be identical modes or not, and the third and fifth modes may be identical modes or not. Here, there are six modes per one half of a cycle of the first voltage signal, more than six or fewer than six are not to be excluded.

More in general, in the FIG. 9, there is a first mode wherein an amplitude of the first current signal has a first constant value and a second mode wherein an amplitude of the first current signal has a first positive derivative value and a third mode wherein an amplitude of the first current signal has a first negative derivative value etc.

Figure 10:
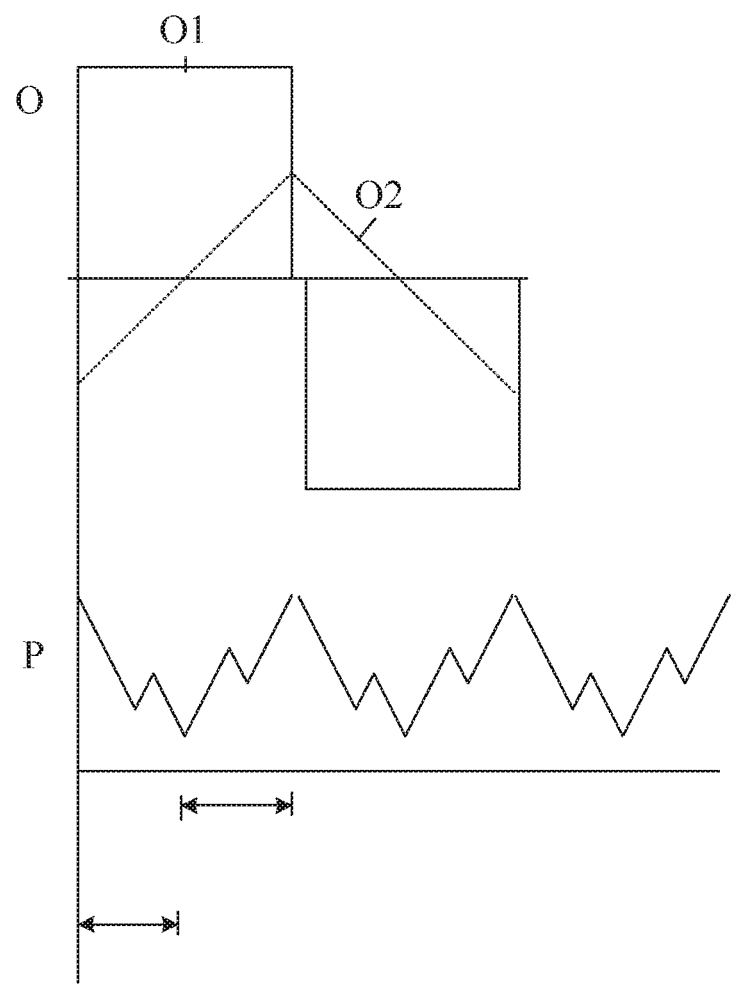
FIG. 10 shows fifth waveforms.

In the FIG. 10, fifth waveforms are shown. In view of the FIGS. 1-5, the graph O1 represents a first voltage signal at an output of the electronic halogen transformer 2, and the graph O2 represents a current signal flowing through the inductor 53. The graph P represents a rectified first current signal flowing from an output of the rectifier 3 to an input of the power converter 4. Here, firstly, a first mode is introduced (the graph P is decreasing), thereafter a second mode is introduced (the graph P is increasing), thereafter a third mode is introduced (the graph P is decreasing), thereafter a fourth mode is introduced (the graph P is increasing), thereafter a fifth mode is introduced (the graph P is decreasing), thereafter a sixth mode is introduced (the graph P is increasing) etc. The first and third and fifth modes may be identical modes or not, and the second and fourth and sixth modes may be identical modes or not. Here, there are six modes per one half of a cycle of the first voltage signal, more than six or fewer than six are not to be excluded.

More in general, in the FIG. 10, there is a first mode wherein an amplitude of the first current signal has a first negative derivative value and a second mode wherein an amplitude of the first current signal has a first positive derivative value and a third mode wherein an amplitude of the first current signal has a second negative derivative value and a fourth mode wherein an amplitude of the first current signal has a second positive derivative value etc.

Figure 11:
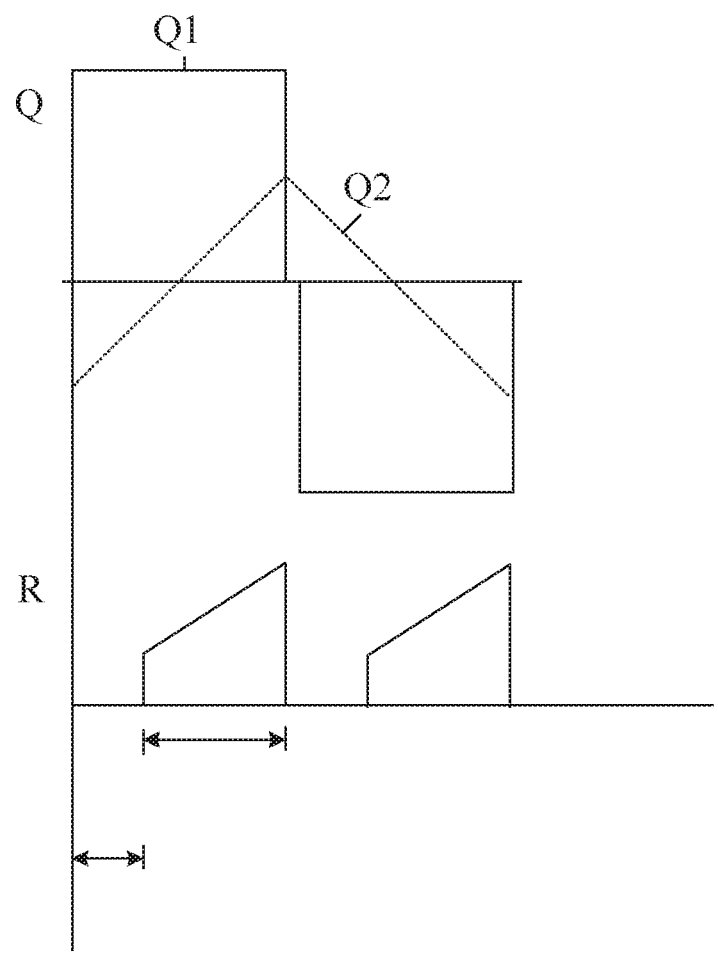
FIG. 11 shows sixth waveforms.

In the FIG. 11, sixth waveforms are shown. In view of the FIGS. 1-5, the graph Q1 represents a first voltage signal at an output of the electronic halogen transformer 2, and the graph Q2 represents a current signal flowing through the inductor 53. The graph R represents a rectified first current signal flowing from an output of the rectifier 3 to an input of the power converter 4. Here, firstly, a first mode is introduced (the graph R is equal to zero), thereafter a second mode is introduced (the graph R is increasing, starting from an offset). Here, there are two modes per one half of a cycle of the first voltage signal, more than two are not to be excluded.

More in general, in the FIG. 11, there is a first mode wherein an amplitude of the first current signal has a first constant value and a second mode wherein an amplitude of the first current signal has a second constant value (the offset) larger than the first constant value and has a first positive derivative value etc.

Figure 12:
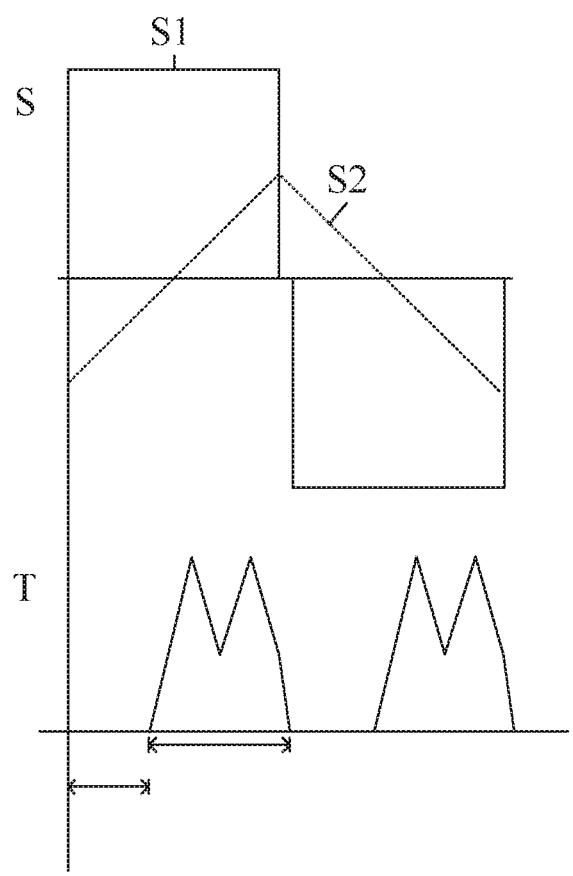
FIG. 12 shows seventh waveforms.

In the FIG. 12, seventh waveforms are shown. In view of the FIGS. 1-5, the graph S1 represents a first voltage signal at an output of the electronic halogen transformer 2, and the graph S2 represents a current signal flowing through the inductor 53. The graph T represents a rectified first current signal flowing from an output of the rectifier 3 to an input of the power converter 4. Here, firstly, a first mode is introduced (the graph T is equal to zero), thereafter a second mode is introduced (the graph T is increasing), thereafter a third mode is introduced (the graph T is decreasing), thereafter a fourth mode is introduced (the graph T is increasing), thereafter a fifth mode is introduced (the graph T is decreasing), thereafter a sixth mode is introduced (the graph T is more decreasing) etc. Here, there are six modes per one half of a cycle of the first voltage signal, more than six or fewer than six are not to be excluded.

More in general, in the FIG. 12, there is a first mode wherein an amplitude of the first current signal has a constant value and a second mode wherein an amplitude of the first current signal has a first positive derivative value and a third mode wherein an amplitude of the first current signal has a first negative derivative value and a fourth mode wherein an amplitude of the first current signal has a second positive derivative value and a fifth mode wherein an amplitude of the first current signal has a second negative derivative value etc.

The electronic halogen transformer 2 may comprise a self-oscillating switched mode power supply designed to provide a first amount of power at its output, whereby the light emitting diode circuit 5 may be designed to consume a second amount of power, the second amount being smaller than the first amount. With the control circuit 1 as shown in the FIGS. 1 and 2, this no longer is a problem.

Preferably, the controller 12 defines an amount of power supplied to the light emitting diode circuit 5 via a definition of a timing of the modes and/or via a definition of the constant values. Further preferably, the controller 12 can change an amount of power supplied to the light emitting diode circuit 5 via a definition of a timing of the modes and/or via a definition of the constant values possibly in response to a detection result from the further detector 13.

For example, in view of the FIG. 6, a first amount of power supplied from the electronic halogen transformer 2 to the power converter 4 may be increased/decreased by increasing/decreasing a duration of the second mode, and by increasing/decreasing a constant value of the first current signal (D1) in the second mode.

For example, in view of the FIG. 7, a first amount of power supplied from the electronic halogen transformer 2 to the power converter 4 may be increased/decreased by increasing/decreasing a duration of the first and third modes, and by increasing/decreasing a constant value of the first current signal (I1) in the first and third mode.

For example, in view of the FIG. 9, a first amount of power supplied from the electronic halogen transformer 2 to the power converter 4 may be increased/decreased by increasing/decreasing a duration of the second, fourth and sixth modes, and by decreasing/increasing a duration of the first, third and fifth modes.

For example, in view of the FIG. 10, a first amount of power supplied from the electronic halogen transformer 2 to the power converter 4 may be increased/decreased by increasing/decreasing a duration of the second, fourth and sixth modes, and by decreasing/increasing a duration of the first, third and fifth modes.

For example, in view of the FIG. 11, a first amount of power supplied from the electronic halogen transformer 2 to the power converter 4 may be increased/decreased by increasing/decreasing a duration of the second mode, and by increasing/decreasing a constant value (here: an offset) of the first current signal (R) in the second mode, and by decreasing/increasing a duration of the first mode.

For example, in view of the FIG. 12, a first amount of power supplied from the electronic halogen transformer 2 to the power converter 4 may be increased/decreased by increasing/decreasing a duration of the second and fourth modes, and by decreasing/increasing a duration of the first, third, fifth and sixth modes.

The value of a (positive/negative) derivative value of the amplitude of the first current signal in a particular mode defines the slope of the first current signal in this mode and is usually not controlled but is defined by one or more parameters of the electronic halogen transformer 2. In view of the FIG. 12, the electronic halogen transformer 2 is solely responsible for the different negative derivative values of the amplitude of the first current signal in the fifth and sixth modes. As a result, in view of the FIG. 12, alternatively, the fifth and sixth modes might be considered to be identical modes and/or one and the same mode of the power converter 4. In the latter case, in the FIG. 12, there are five modes per one half of a cycle of the first voltage signal.

So, the controller 12 may control an average value of the first current signal to control a first amount of power supplied from the electronic halogen transformer 2 to the power converter 4 through (de)activation of at least a part of the power converter 4 and/or through a change in a behavior of at least a part of the power converter 4 to realize the different modes. The (de)activation of at least a part of the power converter 4 may for example comprise a (de)activation of a small part such as a transistor or an impedance or a (de)activation of a large part such as a group of transistors or a stage or a (de)activation of the entire power converter 4 etc. The behavior of at least a part of the power converter 4 may for example comprise a timing behavior or a frequency behavior or an impedance behavior or a hysteretic behavior or an inductive behavior (when comprising an inductor) or a capacitive behavior (when comprising a capacitor) or a (de)charge behavior (when (de)charging an inductor or a capacitor) etc.

The waveforms in the FIG. 9 could for example be realized via a power converter 4 in the form of a (hysteretic controlled) boost converter with modulated hysteretic levels, wherein an inductor charge is released through another supply path. This other supply path allows the controller 12 to switch off the input current of the boost converter instantaneously. The waveforms in the FIG. 10 could for example be realized via a power converter 4 in the form of a hysteretic-controlled boost converter with a dynamic hysteresis level. This hysteresis level is dynamically adjusted in order to track/follow a magnetizing current of the first transformer 25. The waveforms in the FIG. 11 could for example be realized via a power converter 4 in the form of a buck-boost converter (also called fly-back converter). The slope between the minimum and maximum current level depends on an input voltage level and an inductor value in the electronic halogen transformer. The power level depends on the minimum and maximum levels and the duration of the second mode. The waveforms in the FIG. 12 could for example be realized via a power converter 4 in the form a regular hysteretic-controlled boost convert in combination with a pulsed load operation as also shown in the FIGS. 6 and 7 that is based on (de)activation of (a part of) the power converter 4 etc.

In view of the FIGS. 6, 7, 9, 11 and 12, it is observed that, in case one half of a cycle is divided into a first part and a following second part, in accordance with momentary test results, preferably more average power will be drawn in the second part than in the first part. In view of the FIGS. 6, 7 and 9-12, further (positive/negative) offsets may be introduced anywhere.

Summarizing, control circuits 1 bring power converters 4 in different modes in response to detection results. The power converters 4 exchange possibly rectified first voltage/current signals with electronic halogen transformers 2 and supply second voltage/current signals to light emitting diode circuits 5. The first current signals have, in different modes, different amplitudes. The different amplitudes have different constant values and/or different derivative values. As a result, the first current signal has become a relatively varying first current signal. Then, the halogen transformers 2 no longer experience problems that occur when smaller amounts of power need to be provided than designed to. The detections may comprise polarity detections of and/or zero-crossing detections in the first voltage signals. The halogen transformers 2 comprise self-oscillating switched mode power supplies designed to provide first amounts of power at their outputs. The light emitting diode circuits 5 are designed to consume second amounts of power smaller than the first amounts.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a"

or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A control circuit for controlling a power converter, the power converter comprising an input for receiving a first voltage signal and a first current signal or rectified versions thereof with an electronic transformer for halogen lamps, and the power converter comprising an output for supplying a second voltage signal and a second current signal to a light emitting diode circuit, the control circuit comprising a detector for detecting an amplitude of at least one of the first voltage signal and the first current signal, and the control circuit comprising a controller for in response to a detection result from the detector bringing the power converter into different modes, the first current signal in the different modes having different amplitudes, the different amplitudes comprising different constant values and/or different shapes, wherein the controller is arranged to, during each operation half cycle of the electronic transformer:
   deactivate and activate the power converter alternatively, and/or
   change a behavior of at least a part of the power converter for realizing the different modes;
   wherein the electronic transformer comprises a first transistor and a second transistor,
   in each operation half cycle of the electronic transformer, the controller being arranged to:
      deactivate the power converter and no signal flowing from the output of the electronic transformer for a duration wherein there is current signal flowing through junction from a control electrode to a first main electrode of the first transistor,
      activate the power converter after that duration; and
   wherein the different modes include,
   a first mode wherein an amplitude of the first current signal has a first constant value and a second mode wherein an amplitude of the first current signal has a second constant value larger than the first constant value,
   a first mode wherein an amplitude of the first current signal has a first constant value and a second mode wherein an amplitude of the first current signal has a second constant value smaller than the first constant value and a third mode wherein an amplitude of the first current signal has a third constant value larger than the second constant value,
   a first mode wherein an amplitude of the first current signal has a first constant value and a second mode wherein an amplitude of the first current signal has a first positive derivative value and a third mode wherein an amplitude of the first current signal has a first negative derivative value,
   a first mode wherein an amplitude of the first current signal has a first negative derivative value and a second mode wherein an amplitude of the first current signal has a first positive derivative value and a third mode wherein an amplitude of the first current signal has a second negative derivative value and a fourth mode wherein an amplitude of the first current signal has a second positive derivative value,
   a first mode wherein an amplitude of the first current signal has a first constant value and a second mode wherein an amplitude of the first current signal has a second constant value larger than the first constant value and has a first positive derivative value, or
   a first mode wherein an amplitude of the first current signal has a constant value and a second mode wherein an amplitude of the first current signal has a first positive derivative value and a third mode wherein an amplitude of the first current signal has a first negative derivative value and a fourth mode wherein an amplitude of the first current signal has a second positive derivative value and a fifth mode wherein an amplitude of the first current signal has a second negative derivative value.

2. The control circuit as defined in claim 1, wherein the detection of the amplitude of the at least one of the first voltage signal and the first current signal comprises a polarity detection and/or a zero-crossing detection.

3. The control circuit as defined in claim 2, the controller being arranged to introduce at least two entire different modes during one half of a cycle of the first voltage signal.

4. The control circuit as defined in claim 1, the controller being arranged to control an amount of power supplied to the light emitting diode circuit via a control of a timing of the different modes and/or via a control of the constant values.

5. The control circuit as defined in claim 1, the control circuit further comprising a further detector for detecting a value of the first voltage signal or a rectified version thereof and/or a value of the first current signal or a rectified version thereof.

6. The control circuit as defined in claim 5, the controller being arranged to change an amount of power supplied to the light emitting diode circuit via a definition of a timing of the different modes and/or via a definition of the constant values in response to a detection result from the further detector.

7. The control circuit as defined in claim 1, the control circuit further comprising a start-up circuit for injecting a start-up current pulse into the electronic transformer, in case the electronic transformer has stopped oscillating.

8. The control circuit as defined in claim 1, the electronic transformer comprising a self-oscillating switched mode power supply designed to provide a first amount of power at its output, the light emitting diode circuit being designed to consume a second amount of power, the second amount being smaller than the first amount.

9. A device comprising the control circuit as defined in claim 1 and further comprising the power converter and/or the light emitting diode circuit.

10. A method for controlling a power converter, the power converter comprising an input for receiving a first voltage signal and a first current signal or rectified versions thereof with an electronic transformer for halogen lamps, and the power converter comprising an output for supplying a second voltage signals and a second current signal to a light emitting diode circuit, the method comprising a step of detecting an amplitude of at least one of the first voltage signal and the first current signal, and the method comprising a step of in response to a detection result from said detecting bringing the power converter into different modes, the first current signal in the different modes having different amplitudes, the different amplitudes comprising different constant values and/or different shapes, wherein the method further comprises arranging a controller to deactivate and activate the power converter alternatively during each operation half cycle of the electronic transformer;
   wherein the electronic transformer comprises a first transistor and a second transistor,
   in each operation half cycle of the electronic transformer, the controller being arranged to:

deactivate the power converter and no signal flowing from the output of the electronic transformer for a duration wherein there is current signal flowing through junction from a control electrode to a first main electrode of the first transistor, and activate the power converter after that duration;

wherein the different modes include, a first mode wherein an amplitude of the first current signal has a first constant value and a second mode wherein an amplitude of the first current signal has a second constant value larger than the first constant value, a first mode wherein an amplitude of the first current signal has a first constant value and a second mode wherein an amplitude of the first current signal has a second constant value smaller than the first constant value and a third mode wherein an amplitude of the first current signal has a third constant value larger than the second constant value, a first mode wherein an amplitude of the first current signal has a first constant value and a second mode wherein an amplitude of the first current signal has a first positive derivative value and a third mode wherein an amplitude of the first current signal has a first negative derivative value, a first mode wherein an amplitude of the first current signal has a first negative derivative value and a second mode wherein an amplitude of the first current signal has a first positive derivative value and a third mode wherein an amplitude of the first current signal has a second negative derivative value and a fourth mode wherein an amplitude of the first current signal has a second positive derivative value, a first mode wherein an amplitude of the first current signal has a first constant value and a second mode wherein an amplitude of the first current signal has a second constant value larger than the first constant value and has a first positive derivative value, or a first mode wherein an amplitude of the first current signal has a constant value and a second mode wherein an amplitude of the first current signal has a first positive derivative value and a third mode wherein an amplitude of the first current signal has a first negative derivative value and a fourth mode wherein an amplitude of the first current signal has a second positive derivative value and a fifth mode wherein an amplitude of the first current signal has a second negative derivative value.

11. An apparatus for controlling a power converter, the power converter comprising an input for receiving a first voltage signal and a first current signal or rectified versions thereof with an electronic transformer for halogen lamps, and the power converter comprising an output for supplying a second voltage signal and a second current signal to a light emitting diode circuit, the apparatus comprising means for detecting an amplitude of at least one of the first voltage signal and the first current signal, and the apparatus comprising means for in response to a detection result from said detecting bringing the power converter into different modes, the first current signal in the different modes having different amplitudes, the different amplitudes comprising different constant values and/or different shapes, wherein the device further comprises a controller which is arranged to deactivate and activate the power converter alternatively during each operation half cycle of the electronic transformer, wherein the different modes include, a first mode wherein an amplitude of the first current signal has a first constant value and a second mode wherein an amplitude of the first current signal has a second constant value larger than the first constant value, a first mode wherein an amplitude of the first current signal has a first constant value and a second mode wherein an amplitude of the first current signal has a second constant value smaller than the first constant value and a third mode wherein an amplitude of the first current signal has a third constant value larger than the second constant value, a first mode wherein an amplitude of the first current signal has a first constant value and a second mode wherein an amplitude of the first current signal has a first positive derivative value and a third mode wherein an amplitude of the first current signal has a first negative derivative value, a first mode wherein an amplitude of the first current signal has a first negative derivative value and a second mode wherein an amplitude of the first current signal has a first positive derivative value and a third mode wherein an amplitude of the first current signal has a second negative derivative value and a fourth mode wherein an amplitude of the first current signal has a second positive derivative value, a first mode wherein an amplitude of the first current signal has a first constant value and a second mode wherein an amplitude of the first current signal has a second constant value larger than the first constant value and has a first positive derivative value, or a first mode wherein an amplitude of the first current signal has a constant value and a second mode wherein an amplitude of the first current signal has a first positive derivative value and a third mode wherein an amplitude of the first current signal has a first negative derivative value and a fourth mode wherein an amplitude of the first current signal has a second positive derivative value and a fifth mode wherein an amplitude of the first current signal has a second negative derivative value.

* * * * *